[12] United States Patent
Watt et al.

(10) Patent No.: US 7,979,689 B2
(45) Date of Patent: Jul. 12, 2011

(54) ACCESSORY SUPPORT SYSTEM FOR REMOTE INSPECTION DEVICE

(75) Inventors: Brandon Watt, Hartland, MI (US); Al Boehnlein, Ypsilanti, MI (US); Tye Newman, Howell, MI (US); Paul J. Eckhoff, Fenton, MO (US); Jeffrey J. Miller, Northville, MI (US); Jeff Schober, Sterling Heights, MI (US)

(73) Assignee: Perceptron, Inc., Plymouth, MI (US)

( * ) Notice: Subject to any disclaimer, the term of this patent is extended or adjusted under 35 U.S.C. 154(b) by 652 days.

(21) Appl. No.: 12/074,217

(22) Filed: Feb. 29, 2008

(65) Prior Publication Data
US 2009/0198990 A1 Aug. 6, 2009

Related U.S. Application Data

(60) Provisional application No. 61/063,462, filed on Feb. 1, 2008.

(51) Int. Cl.
*G06F 9/24* (2006.01)
*G06F 9/445* (2006.01)
*G06F 15/177* (2006.01)

(52) U.S. Cl. ............... 713/2; 710/11; 710/106; 717/173; 717/178

(58) Field of Classification Search .................... 700/11, 700/12; 713/1, 2; 717/168–178; 710/8–11, 710/104–106, 300–306, 314, 315; 370/464–467, 370/469; 719/321–327; 709/230–237
See application file for complete search history.

(56) References Cited

U.S. PATENT DOCUMENTS

| 5,598,577 | A  | * | 1/1997  | Overfield ........................ 710/10 |
| 5,872,968 | A  | * | 2/1999  | Knox et al. ...................... 713/2 |
| 6,275,869 | B1 | * | 8/2001  | Sieffert et al. ................ 719/321 |
| 6,360,334 | B1 | * | 3/2002  | Kavanagh et al. .............. 714/38 |
| 6,564,337 | B1 | * | 5/2003  | Yoneda et al. .................... 714/4 |
| 6,760,755 | B1 | * | 7/2004  | Brackett ....................... 709/214 |
| 7,062,579 | B2 | * | 6/2006  | Tateyama et al. ............. 710/104 |
| 7,363,514 | B1 | * | 4/2008  | Behren .............................. 713/2 |
| 7,398,408 | B2 | * | 7/2008  | Paljug ............................ 713/323 |
| 7,401,213 | B2 | * | 7/2008  | Tateyama et al. ................. 713/1 |
| 7,430,660 | B2 | * | 9/2008  | Fukunaga et al. ................ 713/2 |
| 2002/0161852 | A1 | * | 10/2002 | Allen et al. ................... 709/217 |
| 2003/0055919 | A1 | * | 3/2003  | Fong et al. .................... 709/220 |
| 2006/0253415 | A1 | * | 11/2006 | Chakraborty et al. ............ 707/1 |
| 2006/0287001 | A1 | * | 12/2006 | Budampati et al. ......... 455/552.1 |
| 2007/0011335 | A1 | * | 1/2007  | Burns et al. ................... 709/227 |
| 2007/0162634 | A1 | * | 7/2007  | Okazaki .......................... 710/15 |
| 2010/0013666 | A1 | * | 1/2010  | Panades et al. .......... 340/870.02 |

* cited by examiner

*Primary Examiner* — M. N. Von Buhr
(74) *Attorney, Agent, or Firm* — Harness, Dickey & Pierce, P.L.C.

(57) ABSTRACT

A remote inspection apparatus has an active display unit receiving image data in digital form and graphically rendering the image data on an active display. A communication medium connects devices to the active display unit, such as an imager head capturing the image data. A computer readable medium records one or more instances of software for operating the one or more devices. A computer processor located in the active display unit that operates a boot loader program to detects and sequentially interrogate the devices by different protocols in order to determine appropriate software to load and operate the devices.

16 Claims, 14 Drawing Sheets

ACCESSORY SUPPORT SYSTEM FOR REMOTE INSPECTION DEVICE

CROSS-REFERENCE TO RELATED APPLICATIONS

This application claims the benefit of U.S. Provisional Application No. 61/063,462, filed on Feb. 1, 2008. The disclosure of the above application is incorporated herein by reference.

FIELD

The present disclosure relates generally to borescopes and video scopes.

BACKGROUND

Borescopes and video scopes for inspecting visually obscured locations are typically tailored for particular applications. For instance, some borescopes have been tailored for use by plumbers to inspect pipes and drains. Likewise, other types of borescopes have been tailored for use by mechanics to inspect interior compartments of machinery being repaired.

The statements in this section merely provide background information related to the present disclosure and may not constitute prior art.

SUMMARY

A remote inspection apparatus has an active display unit receiving image data in digital form and graphically rendering the image data on an active display. A communication medium connects devices to the active display unit, such as an imager head capturing the image data. A computer readable medium records one or more instances of software for operating the one or more devices. A computer processor located in the active display unit that operates a boot loader program to detects and sequentially interrogate the devices by different protocols in order to determine appropriate software to load and operate the devices.

Further areas of applicability will become apparent from the description provided herein. It should be understood that the description and specific examples are intended for purposes of illustration only and are not intended to limit the scope of the present disclosure.

DRAWINGS

FIG. 1, including FIGS. 1A-1F, is a set of views illustrating a handheld, remote user interface for use with a remote inspection device.

FIG. 2, including FIGS. 2A-2C is a diagram illustrating remote inspection devices.

Figure 4A:
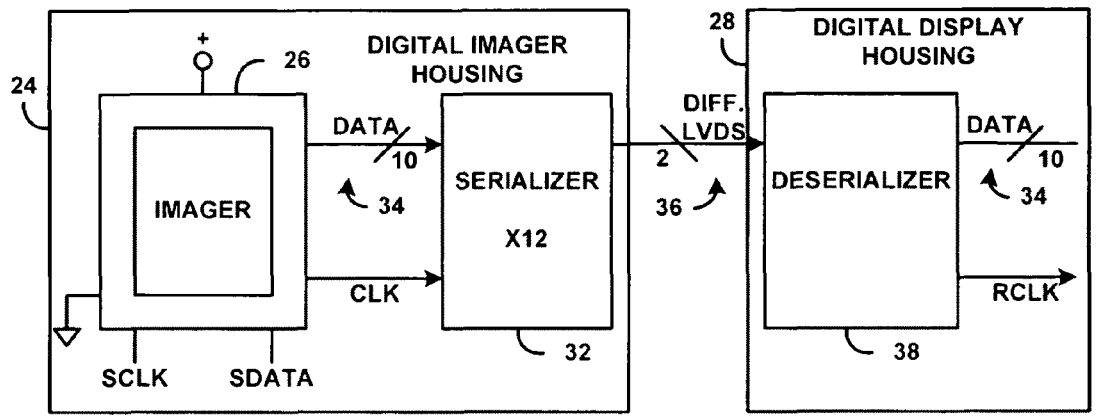
Figure 4B:
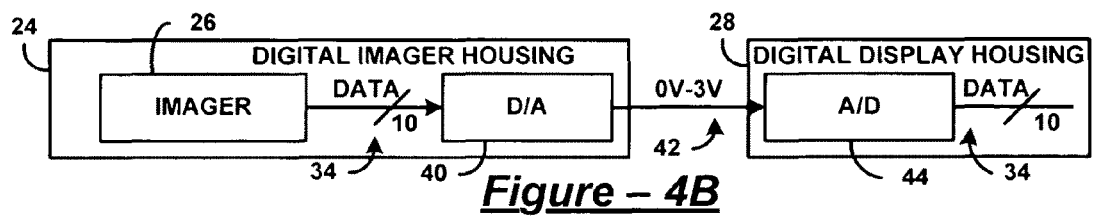
Figure 4C:
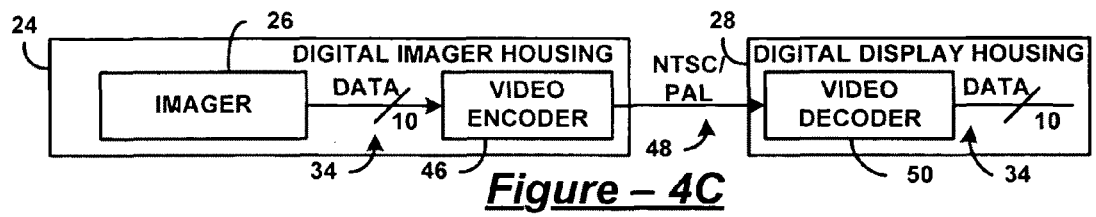

FIG. 4, including FIGS. 4A-4C, is a set of block diagrams illustrating signal conversion and transmission in a remote inspection device.

Figure 5A:
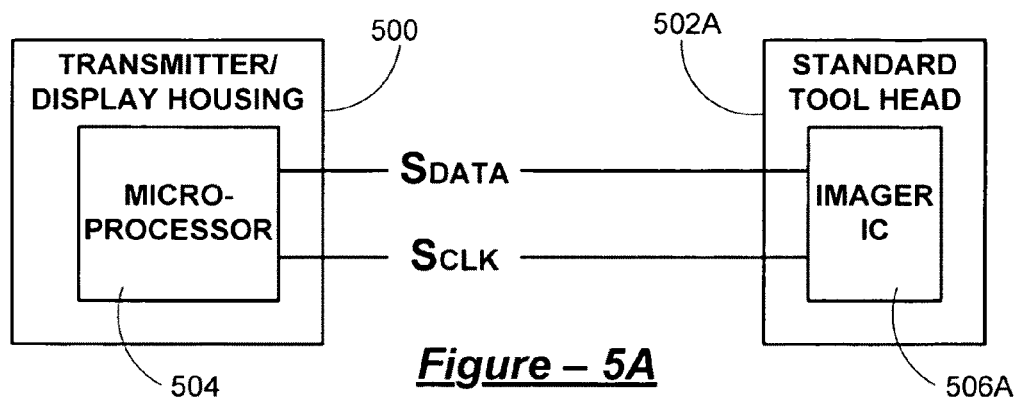
Figure 5B:
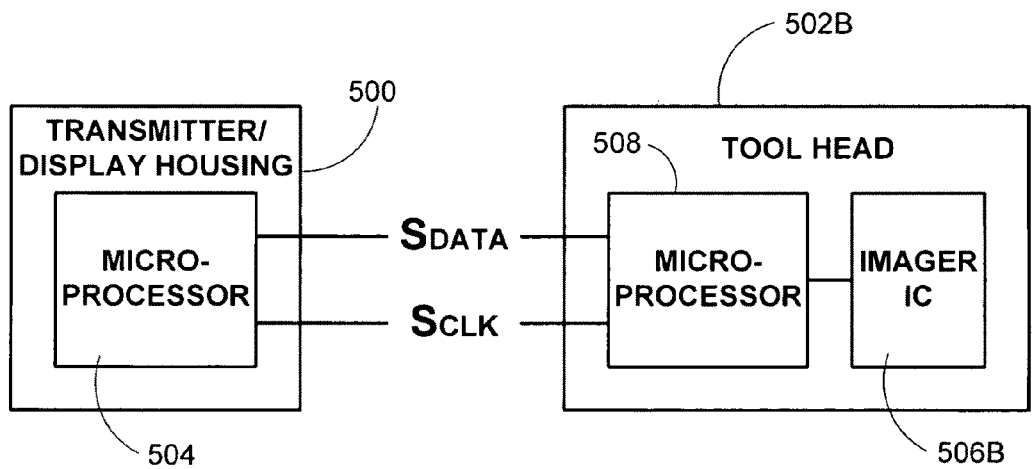

FIG. 5, including FIGS. 5A and 5B, is a set of block diagrams illustrating device type discovery by conditionally and sequentially employing multiple communication protocols during an enumeration process.

Figure 6:
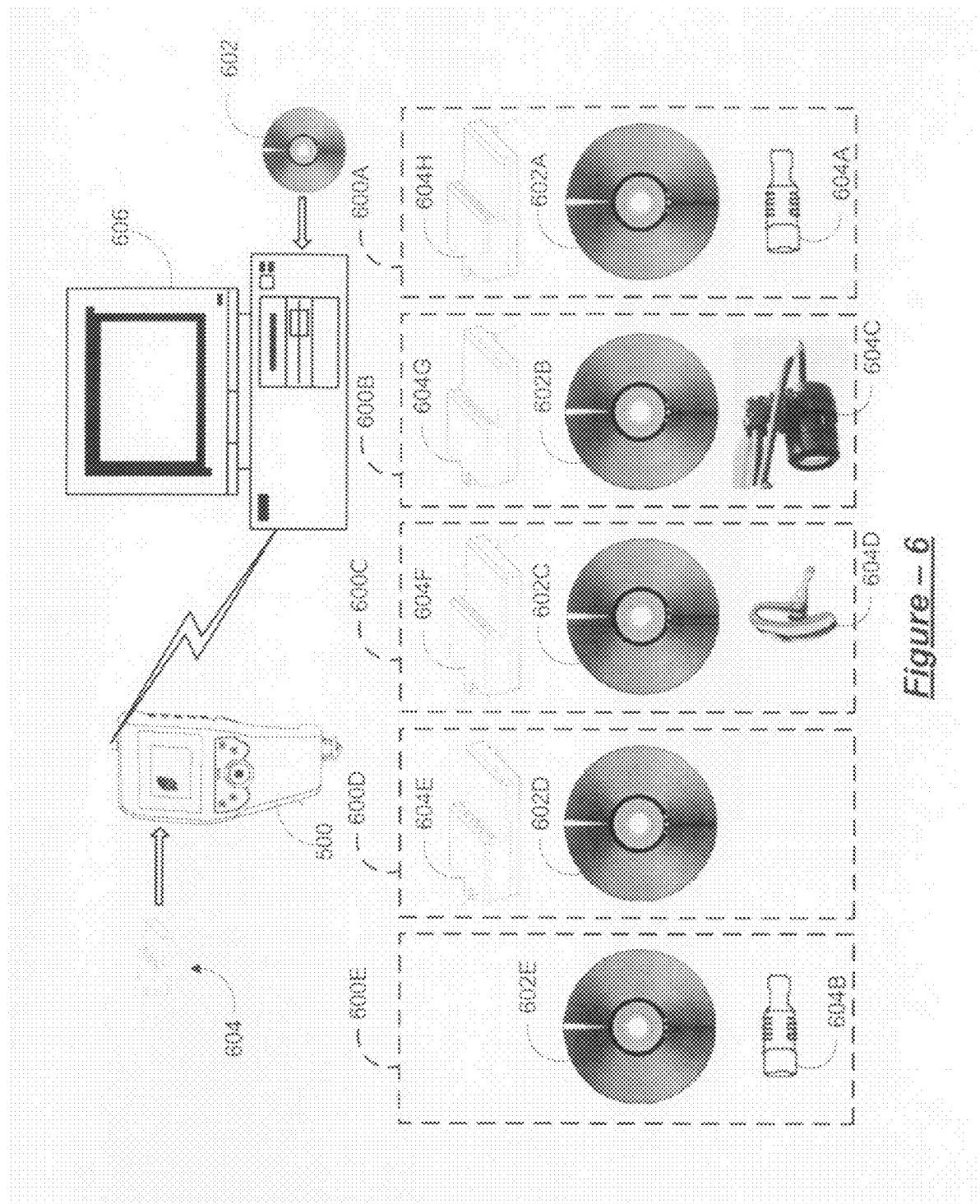

FIG. 6 is a block diagram illustrating remote inspection device accessory upgrade kits.

Figure 7:
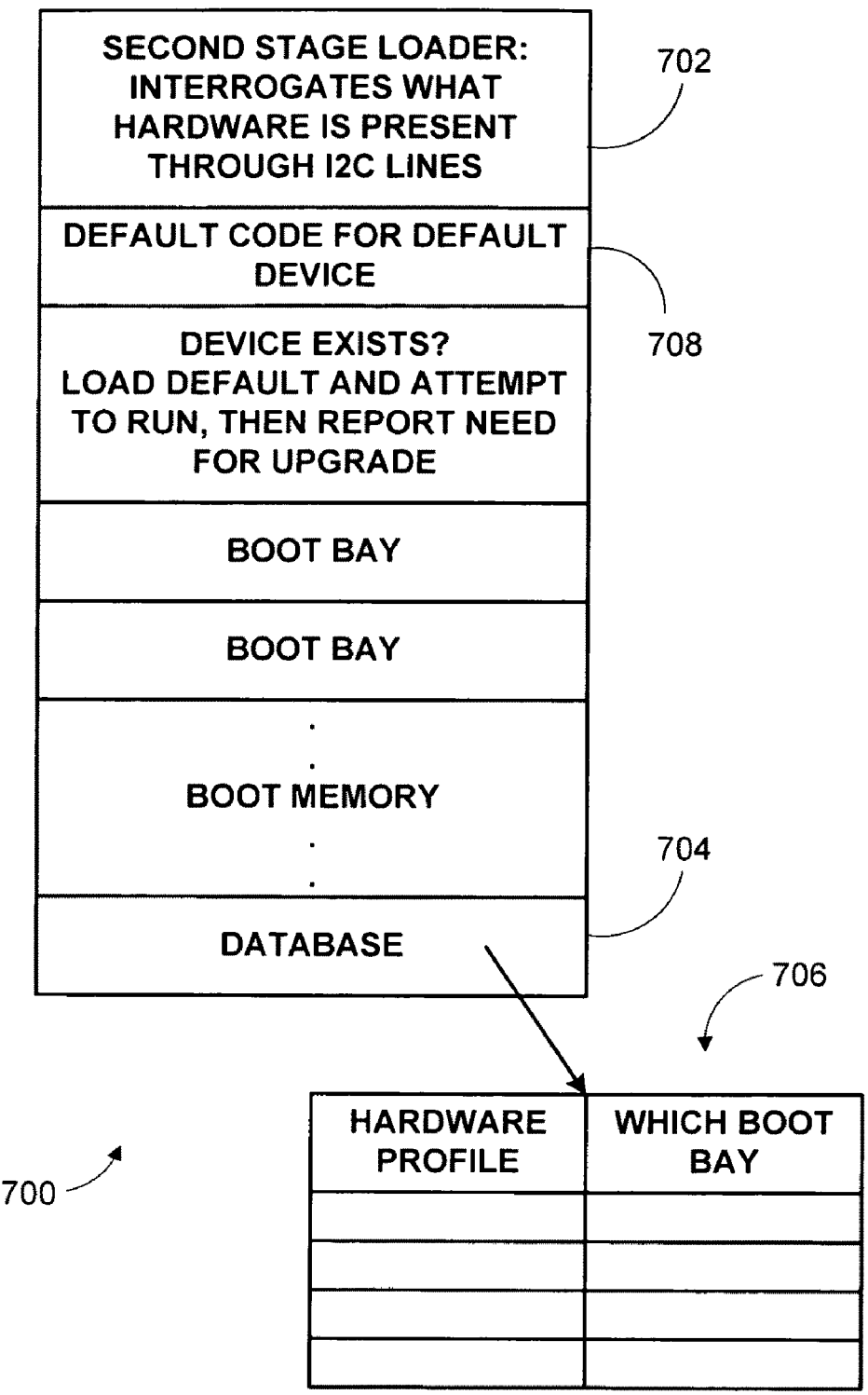

FIG. 7 is a block diagram illustrating a boot memory of a remote inspection device.

Figure 8:
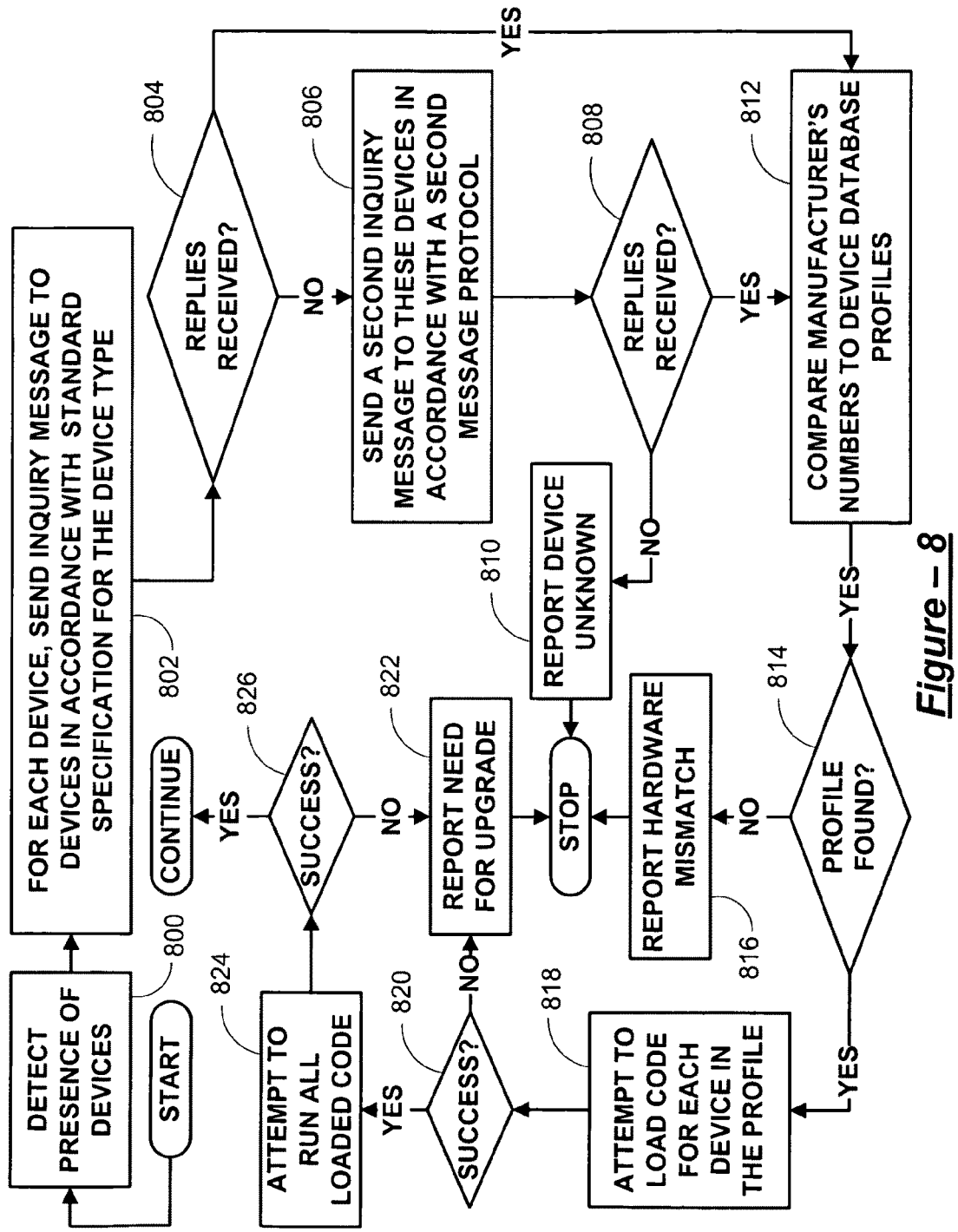

FIG. 8 is boot method for a remote inspection device having accessory upgrade support.

The drawings described herein are for illustration purposes only and are not intended to limit the scope of the present disclosure in any way.

DETAILED DESCRIPTION

Referring generally to FIGS. 1A-1F, a handheld user interface 100 for use with a remote inspection device has one or more output components such as an active display 102. A number of user interface input components 104 are also provided, such as buttons, joysticks, push pads and the like. In some embodiments, the user interface 100 can include a gyroscope, accelerometer, and/or GPS, such as differential GPS. Connection mechanisms 104, such as number of data ports and/or docking bays, can also be provided.

In some embodiments, data ports of the connection mechanisms 104 can include USB ports, Fire-wire ports, Bluetooth, and the like. These data ports can be located within a chamber of the user interface that is protected by a cover 105, such as a rubber grommet or the like. In some embodiments, the cover 105 can have a tab 107 facilitating user removal of the cover. In additional or alternative embodiments, the cover 105 can be attached on one end to an edge of the chamber opening by a hinge to ensure that the cover 105 is not lost when removed.

In additional or alternative embodiments, a docking bay of connection mechanisms 106 includes an expansion card docking bay that holds two expansion cards 108. The docking bay uses a keyway 110 to guide insertion of the expansion cards 108 and hold them in place on board 112. The expansion cards 108 have a rail 114 that fits within the keyway 110. The expansion cards also have a grasp facilitation component 116 that facilitates user manipulation and guides orientation of the cards 108.

Figure 1A:
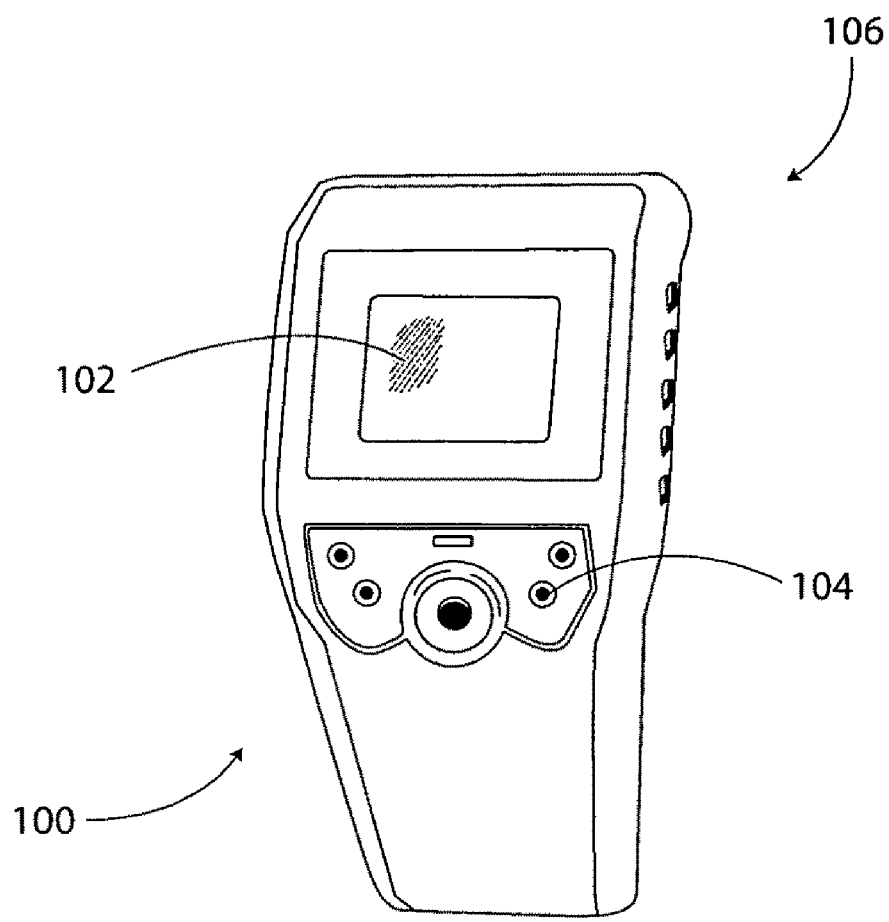
Figure 1B:
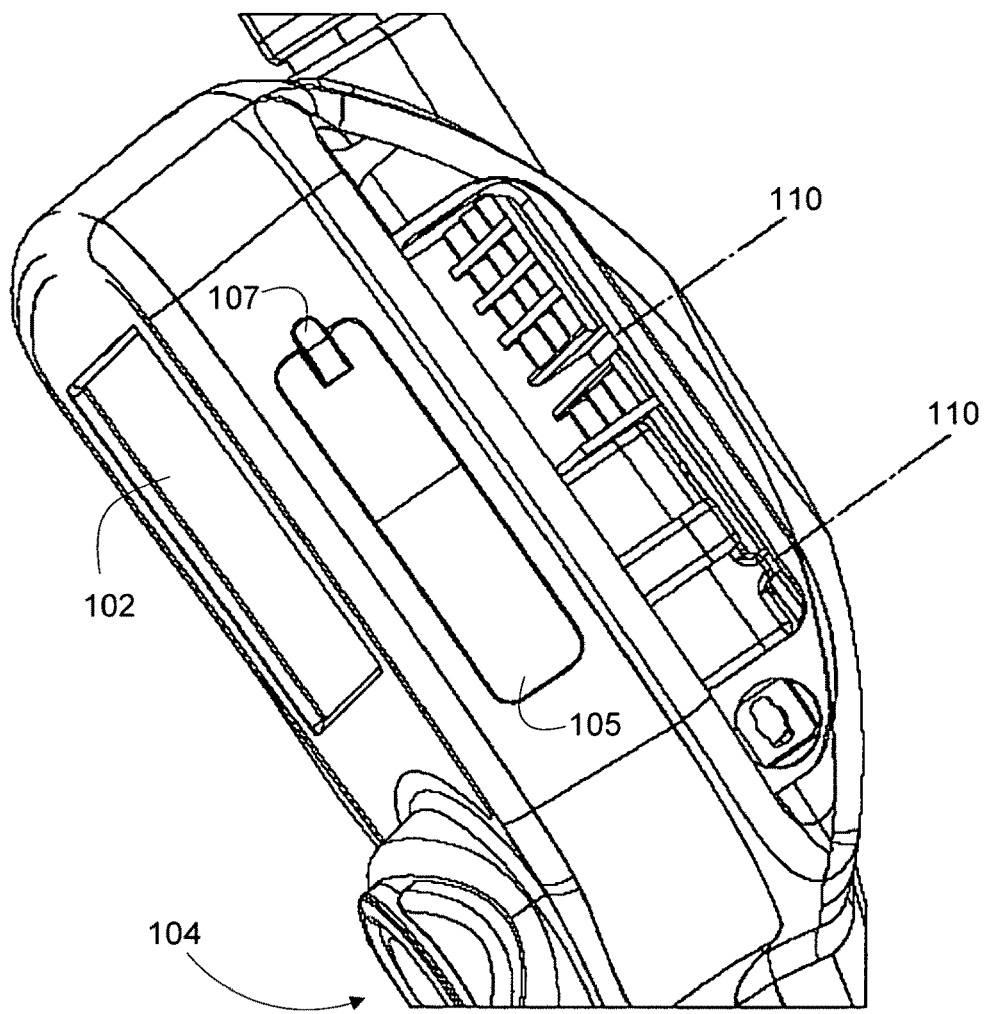
Figure 1C:
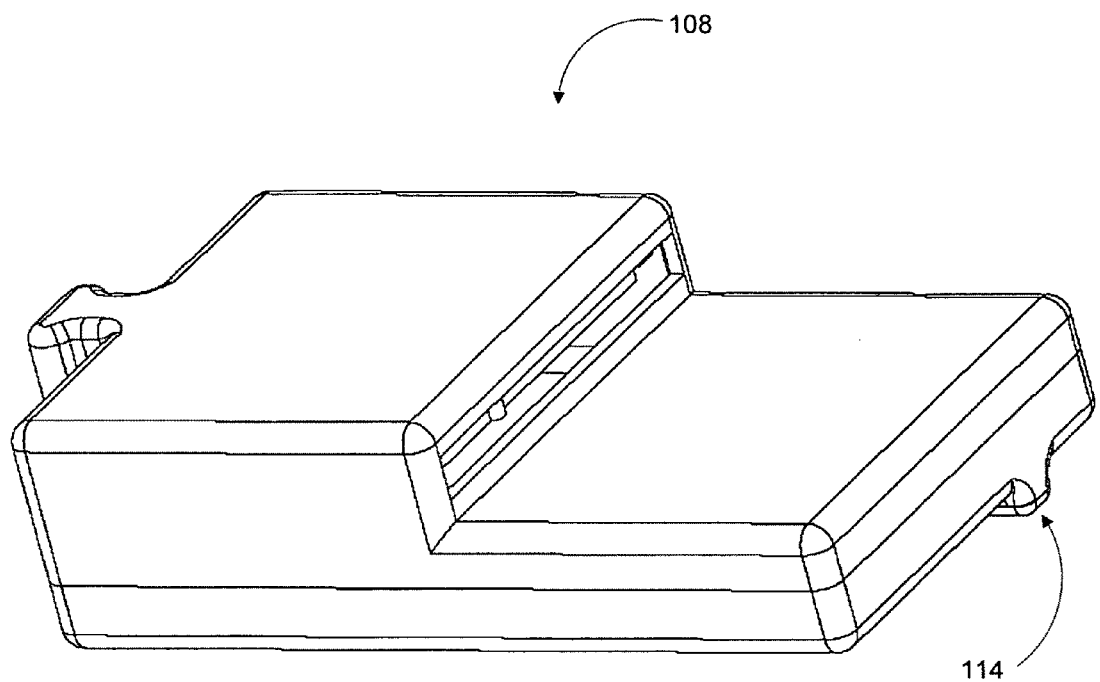
Figure 1D:
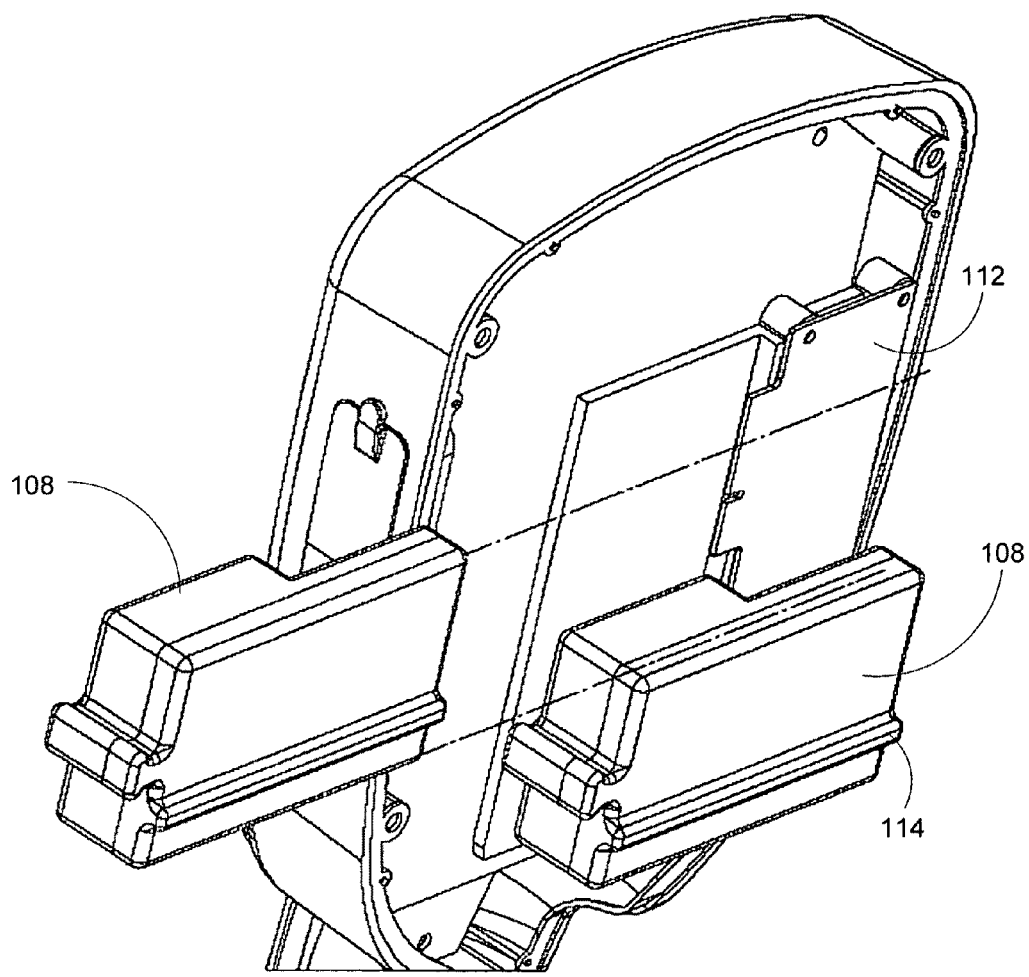
Figure 1E:
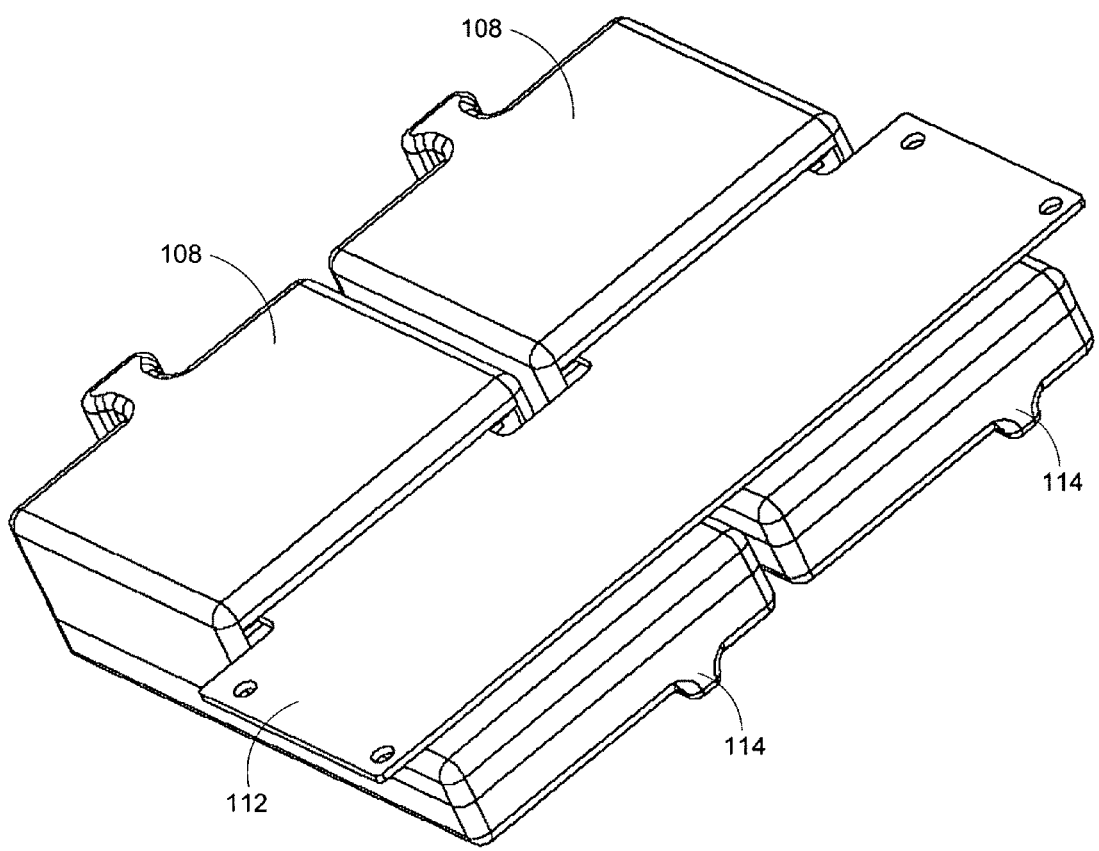
Figure 1F:
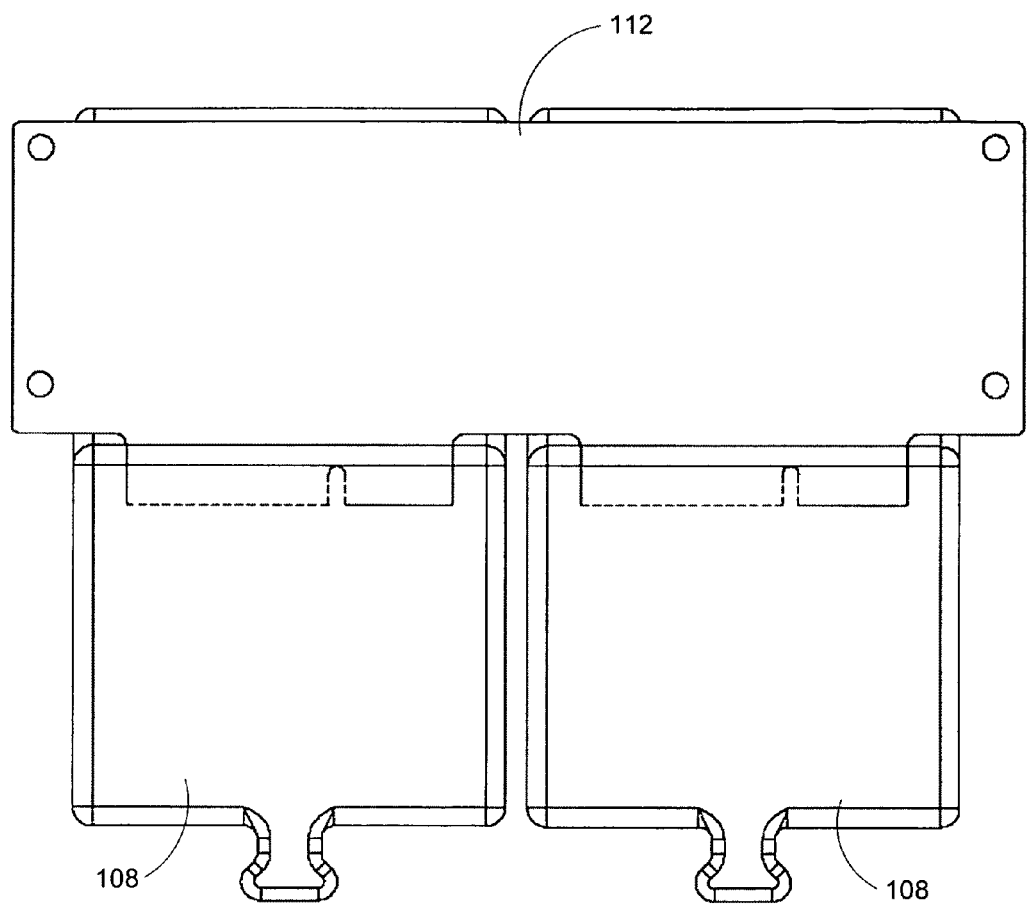
Figure 2A:
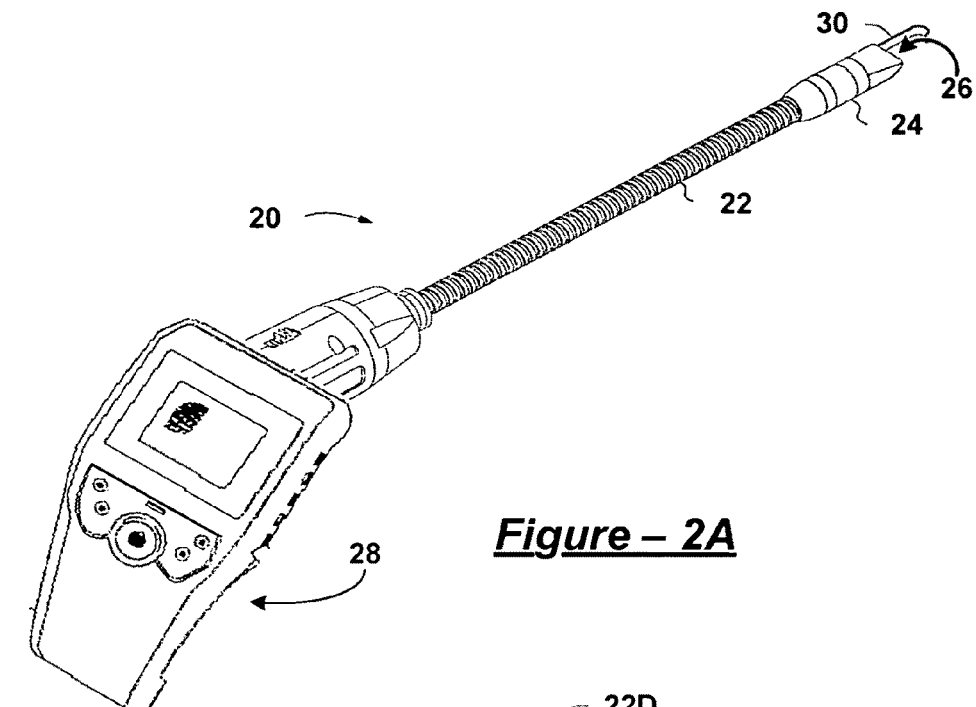

Turning now to FIG. 2A, an embodiment of a remote inspection device is generally comprised of three primary components: a digital display housing 28, a digital imager housing 24, and a flexible cable 22 interconnecting the digital display housing 28 and the digital imager housing 24. The flexible cable 22 is configured to bend and/or curve as it is pushed into visually obscured areas, such as pipes, walls, etc. The flexible cable 22 is a ribbed cylindrical conduit having an outer diameter in the range of 1 cm. The conduit is made of either a metal, plastic or composite material. Smaller or larger diameters are suitable depending on the application. Likewise, other suitable constructions for the flexible cable 22 are also contemplated by this disclosure.

The digital imager housing 24 is coupled to a distal end of the flexible cable 22. The digital imager housing 24 is a substantially cylindrical shape that is concentrically aligned with the flexible cable 22. However, it is envisioned that the digital imager housing 24 takes other shapes. In any case, an outer diameter of the cylindrical digital imager housing 104 is preferably sized to be substantially equal to or less than the outer diameter of the flexible cable 102.

A digital imaging device 26 is embedded in an outwardly facing end of the cylindrical digital imager housing 24. The digital imaging device 26 captures an image of a viewing area proximate to the distal end of the flexible cable 22 and converts the image into a digital video signal. In some embodiments, an attachment 30 is removably coupled to the digital imager housing 14.

The digital imaging device 106 requires relatively more signal wires than a non-digital imaging device. Therefore, and referring now to FIG. 4A, a digital video signal conversion device is included in the digital imager housing 24 in order to serialize the digital video signal and thereby reduce the number of wires required to be threaded through the flexible cable 22 (see FIG. 2A). For example, and with particular reference to FIG. 4A, the number of wires required to transmit the video signal from the digital imager housing to the digital display can be reduced from eighteen wires to eight wires by using a differential LVDS serializer 32 in the digital imager housing 24 to reformat the digital video signal 34 to a differential LVDS signal 36. Then, a differential LVDS deserializer 38 in the digital display housing 28 receives the LVDS signal 36 and converts it back to the digital video signal 34 for use by the digital video display. In this case, the LVDS signal 36 replaces the twelve wires required to transmit the digital video signal with two wires required to transmit the LVDS signal. Six more wires are also required: one for power, one for ground, two for the LED light sources, one for a serial clock signal, and one for a serial data signal. One skilled in the art will recognize that the serial clock signal and the serial data signal are used to initiate the digital imaging device 26 at startup. In some additional or alternative embodiments, it is possible to reduce the number of wires even further by known techniques.

Referring now to FIG. 4B, in another embodiment a digital to analog converter 40 in the digital imager housing 24 converts the digital video signal 34 to an analog video signal 42. This analog video signal 42 is in turn received by analog to digital converter 44 in the display housing 28, and is converted back to the digital video signal 34. Like use of a serializer, the use of the analog to digital converter reduces the number of wires from eighteen wires to eight wires. Again, two wires are needed to provide the analog voltage signal.

Referring now to FIG. 4C, in yet another embodiment the digital video signal 34 is converted to an NTSC/PAL signal 48 by a video encoder 46 in the digital imager housing 24. One skilled in the art will readily recognize that NTSC is the standard for television broadcast in the United States and Japan, while PAL is its equivalent European standard. This NTSC/PAL signal 48 is then reconverted to digital video signal 34 by video decoder 50 of display housing 28.

Returning the digital video signal to its original form allows use of a digital display to render the video captured by the digital imaging device 104. Use of the digital display can leverage various capabilities of such displays. For example, digital pan and zoom capability can be acquired by use of a larger imager in terms of pixels than the display, or by digital zoom. Thus, the display can be moved for greater detail/flexibility within the fixed visual cone of the imager head. Also, a software toggle can be implemented to increase perceived clarity and contrast in low spaces by switching from color to black and white.

Figure 2B:
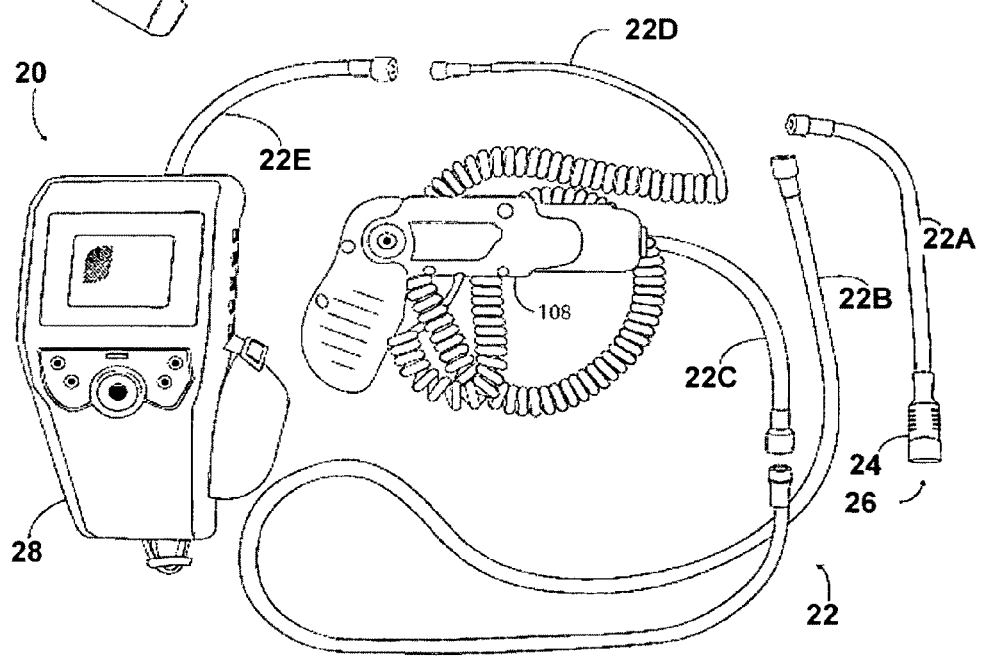

Turning now to FIG. 2B, another embodiment of the modular remote inspection device 20 has a remote digital imager housing 28. In this instance, the remote housing 28 is configured to be held in another hand of the user of the inspection device 20, placed aside, or detachably attached to the user's person or a convenient structure in the user's environment. The flexible cable 22 is attached to and/or passed through a push stick housing 52 that is configured to be grasped by the user. A series of ribbed cylindrical conduit sections 22A-22C connects the push stick housing 52 to the cylindrical digital imager housing 24. One or more extension sections 22B are detachably attached between sections 22A and 22C to lengthen the portion of flexible cable 22 interconnecting push stick housing 52 and digital imager housing 24. It should be readily understood that the sections 102A-C can also be used in embodiments like those illustrated in FIG. 2A in which the digital display housing 28 is not remote, but is instead combined with push stick housing 52.

Returning to FIG. 2B, the flexible cable passes through push stick housing 52 to digital display housing 28. For example, a coiled cable section 22D extending from push stick housing 52 connects to a ribbed cylindrical conduit section 22E extending from digital display housing 28. Thus, flexible cable 22 carries a serialized digital video signal from digital imaging device 26 through the ribbed cylindrical conduit sections 22A-22C to push stick housing 52, through which it is transparently passed through to the remote digital video display housing 28 by the coiled cable section 22D and the ribbed cylindrical conduit section 22E. It should be readily understood that one or more extension sections 22B can be used to lengthen either or both of the cable portions interconnecting the push stick housing 52 with the digital display housing 28 and the digital imager housing 24.

Another embodiment is envisioned in which flexible cable 22 terminates at the push stick housing 52, and push stick housing 52 includes a wireless transmitter device, thereby serving as a transmitter housing. In such an embodiment, it should be readily understood that digital display housing 28 contains a wireless receiver device, and the serialized digital video signal is transmitted wirelessly from the push stick housing 52 to the digital display housing 28. It should also be readily understood that one or more antennas are provided to the push stick housing 52 and the digital display housing 28 to facilitate the wireless communication. Types of wireless communication suitable for use in this embodiment include Bluetooth, 802.11(b), 802.11(n), wireless USB, and others.

Figure 2C:
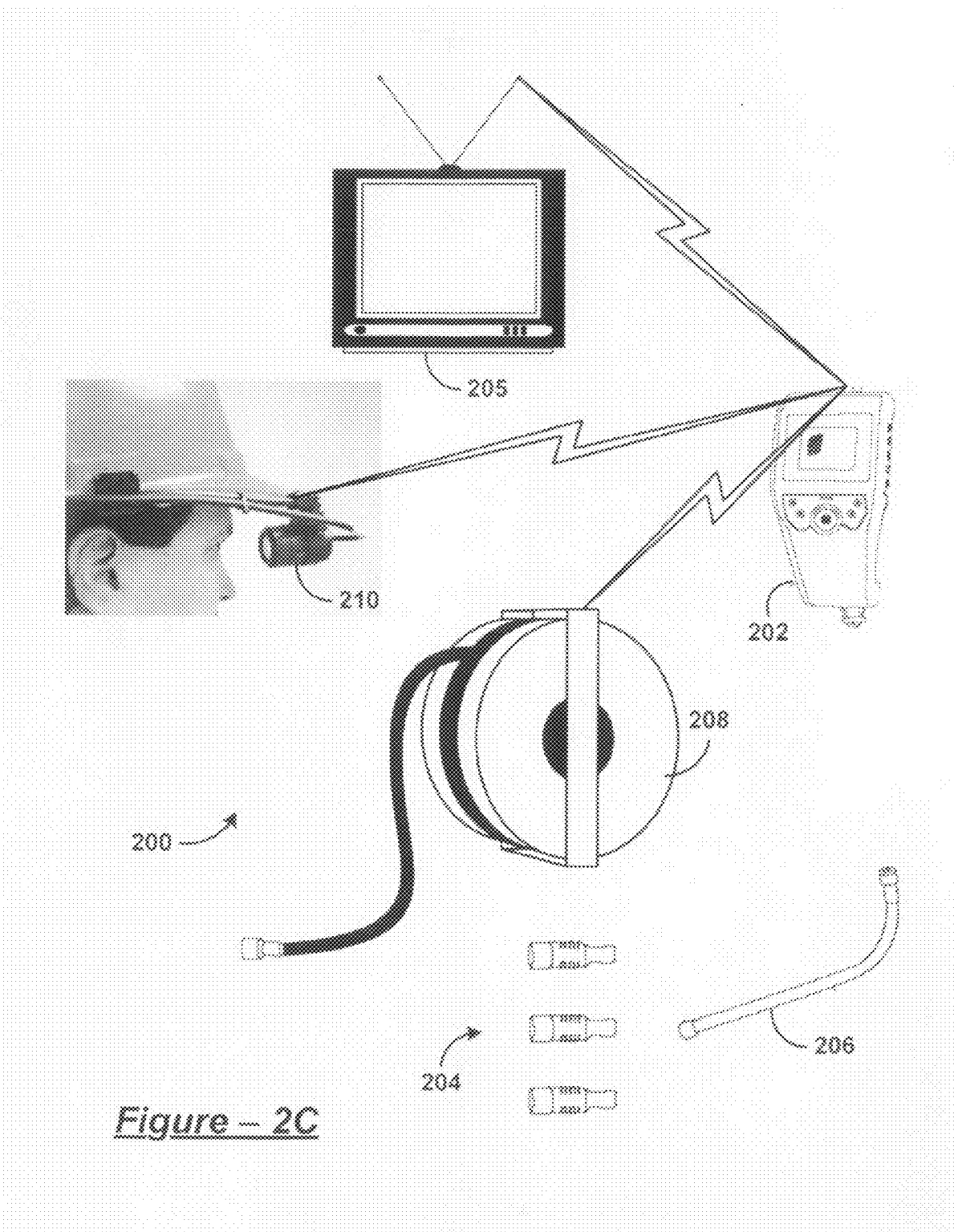

Referring generally to FIGS. 2A-2C some embodiments of the remote inspection device 200 have virtual reality and/or augmented reality display functionality. In one or more of these embodiments, movement tracking sensors located in a display unit and imager head provide information useful for determining display unit position and orientation and/or imager head position and orientation. Display unit movement tracking sensors are disposed in the display unit. Example display unit movement tracking sensors include an accelerometer, gyroscope, sonar technology with triangulation, differential GPS, gimbal, and/or eyeball ballast. Imager head movement tracking sensors are disposed in the imager head, the motorized reel, and/or in the display unit. Example imager head movement tracking sensors disposed in the imager head include an accelerometer, gyroscope, optical mouse, sonar technology with triangulation, differential GPS, gimbal, and/or eyeball ballast. Example imager head movement tracking sensors disposed in the reel include a deployment sensor tracking movement of a cable feeding and retracting the imager head. Example imager head movement tracking sensors disposed in the display unit include a software module extracting motion vectors form video captured by an imager in the imager head.

In some of these embodiments, information about the imager head position and orientation is used to generate and render a marker on an active display that indicates the imager head position and orientation to the user. Example markers include 3D coordinates of the imager head, an icon indication position and orientation of the imager head, and a 3D path of the imager head. The marker is directly rendered to the active display. The marker is also rendered to an augmented reality display by using the position and orientation of the display to dynamically display the marker to communicate a path and position of the imager head in the user's environmental surroundings.

In some embodiments, the information about the display position and orientation is employed to control the imager head movement. In this respect moving the display housing from side to side articulates the angle of the imager head. Micro-motors in the imager head, flex-wire cable, and/or wired cable are used to articulate the imager head. In some embodiments, moving the display housing forward and backwards feeds and retracts the imager head using a motorized cable reel.

In some embodiments, the information about the position and orientation of the display housing is used to post process the digital images. This post processing is performed to pan, zoom, and/or rotate the digital image. In some embodiments, the information about the position of the imager head is used to rotate the image in order to obtain an "up is up" display of the digital image.

Referring now particularly to FIG. 2C, a user interface embodied as a handheld display 202 has user interface input components to control position of one of imager heads 204. Additionally, handheld display 202 has sensors, such as an accelerometer, gyroscope, gimbal, and/or eyeball ballast, for tracking movement of the handheld display 202. In a mode of operation selected by a user, the sensed movement of the handheld display 202 is also employed to control position of the imager head 204. In another mode of operation selected by the user, the user interface input components and sensed movement of the handheld display 202 are employed to process (e.g., pan, zoom, etc.) captured images displayed by handheld display 202. Captured images that are not processed are additionally communicated to a remote display 205. In a further mode of operation selected by the user, sensed movement of the handheld display is employed to process captured images, while the user interface input components are employed to control position of the one or more imager heads. In an additional mode of operation selected by the user, the sensed movement of the handheld display is employed to control position of the one or more imager heads, while the user interface input components are employed to control processing of the captured images.

One mechanism for positioning the head includes a motorized cable reel 208 that feeds and/or retracts the head by feeding and/or retracting the cable. Other mechanisms suitable for use in positioning the imager head include micro-motors in the imager head that articulate the imager and/or imager head, wires in a cable section 206 that articulate the imager head 204, and/or flex-wire of the cable section that articulates the imager head 204.

Reel 208 can include a wireless transmitter device, thereby serving as a transmitter housing. It should be readily understood that digital display housing 202 contains a wireless receiver device, and that a serialized digital video signal is transmitted wirelessly from the reel 208 to the handheld display 202. Types of wireless communication suitable for use with the remote inspection device include Bluetooth, 802.11 (b), 802.11(g), 802.11(n), wireless USB, Xigbee, analog, wireless NTSC/PAL, and others.

As described further below with reference to FIG. 3, two or more light sources protrude from an outwardly facing end of the cylindrical imager head 300 along a perimeter of one or more imagers 302 and/or 304. The imagers 302 and/or 304 are recessed directly or indirectly between the light sources. The light sources are super bright LEDs. Super bright LEDs suitable for use with the imager head include Nichias branded LEDs. The super bright LEDs produce approximately twelve times the optical intensity compared to standard LEDs. Specifically, super bright LEDs, such as 5 mm Nichias LEDs, produce upwards of 1.5 lumens each. The inclusion of the super bright LEDs produces a dramatic difference in light output, but also produces much more heat than standard LEDs. Therefore, the imager housing includes a heat sink to accommodate the super bright LEDs.

A transparent cap encases the imagers 302 and 304 and light sources within the imager head 300. The transparent cap also provides imaging optics (i.e., layered transparent imager cap) in order to effectively pull the focal point of the one or more imagers 302 and/or 304 outward compared to its previous location. For a given shape imager head 300, this change in the focal point widens the effective field of view, thus rendering a snake formed of the flexible cable and imager head 300 more useful. This change in focal point also allows vertical offset of the one or more imagers 302 and 304 from the light producing LEDs, thus making assembly of a smaller diameter imager head 300 possible.

Returning briefly to FIG. 2C, various types of imager heads 204 are provided, each having different types and/or combinations of imaging devices, light sources, and/or imaging optics that are targeted to different types of uses. For example, one of the imager heads 204 lacks light sources and imaging optics. Also, one of the imager heads 204 has light sources producing relatively greater amounts light in the infrared spectrum than another of the imager heads provides. In this case, LEDs are employed that produce light in the infrared spectrum, and optical filters that selectively pass infra red light are included in the imaging optics. This infrared imaging head is especially well suited to night vision and increasing the view distance and detail in galvanized pipe. In another of the imager heads, light sources are omitted to accomplish a thermal imaging head that has an infrared filter. An additional one of the imager heads 204 has light sources capable of producing light in the ultraviolet spectrum. In this case, LEDs are employed that produce light in the ultraviolet spectrum, the imaging optics include an optical filter that selectively passes ultraviolet light. This ultraviolet imager head is especially well suited for killing bacteria and fluorescing biological materials. A further one of the imager heads 204 has white light sources. Moreover, at least one of the imager heads 204 has multiple imagers. One such imager head has a thermal imaging device and a visible spectrum imaging device. In this case, when the thermal imaging device is operated instead of the visible spectrum imaging device, visible light sources of the head is extinguished to allow thermal imaging. It should be readily understood, that any or all of the different types of imager heads 204 can be supplied separately or in any combination.

Digital display 202 stores software in computer readable memory and executes the software with a computer processor in order to operate the heads 204. The software for operating the heads 204 has various modes of operation for use in operating different types of the imager heads 204. The software for operating the digital display also has image processing capability to enhance images. The image processing capabilities are specific to different ones of the imager heads 204.

More information regarding the imager heads, embodiments employing a push stick instead of a reel, and other components that are employed in the aforementioned embodiments, alternative embodiments, or additional embodiments of the present disclosure can be found in U.S. Publication Number 2007/0185379 which published on Aug. 9, 2007 and is entitled *Modular Remote Inspection Device with Digital Imager*. The aforementioned patent publication is incorporated herein in their entirety for any purpose.

One or more of imager heads 204 include environmental condition sensors. For example, one of the imager heads includes a temperature sensor. This sensed environmental condition information is communicated to the handheld display 202, head mounted display 210, and static display 205 for communication to the user. It should also be readily understood that one or more of imager heads 204 do not have an imager.

Figure 3A:
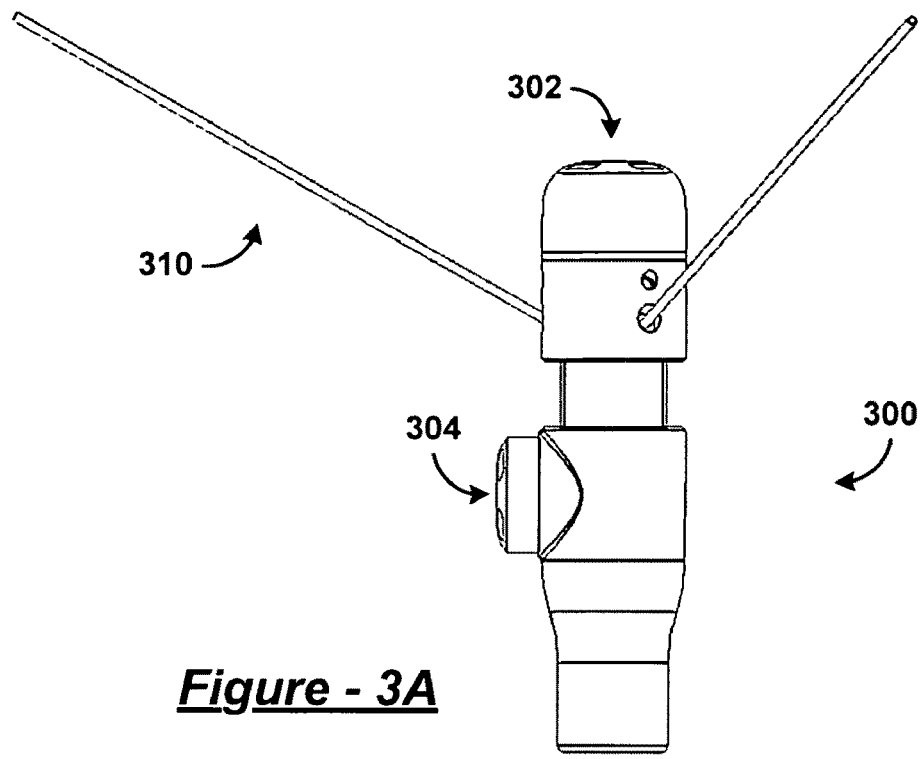
FIG. 3A is a perspective view illustrating an imager head having multiple imagers and imager movement sensors.
Figure 3B:
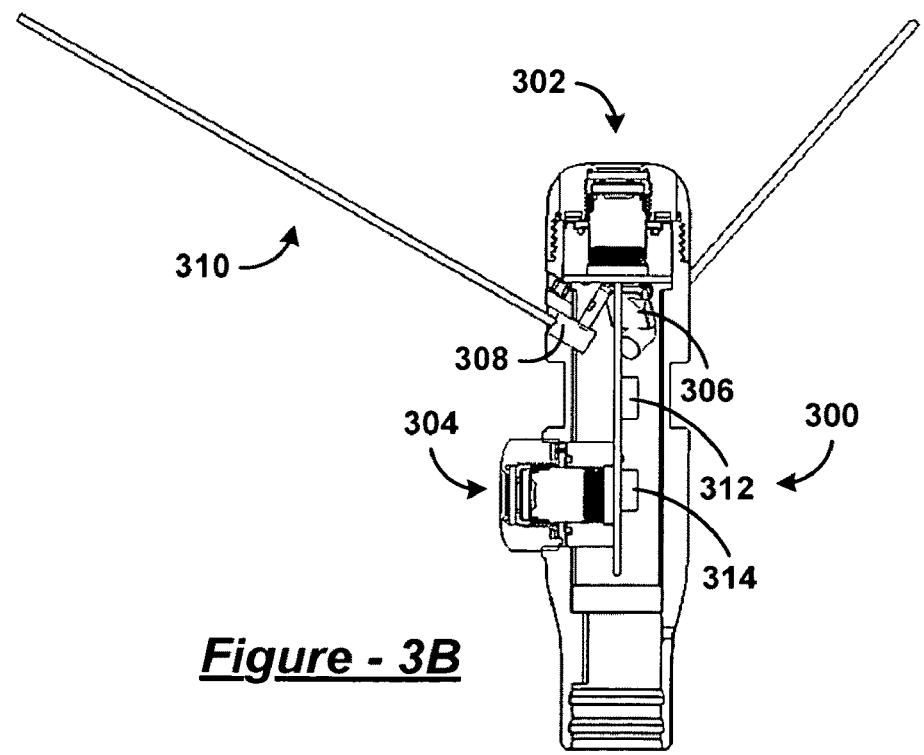
FIG. 3B is a cross-sectional view illustrating the imager head of FIG. 3A.

Turning now to FIGS. 3A and 3B and referring generally thereto, an imager head 300 has more than one imager. For example, the imager head 300 has a first imager 302 and a second imager 304 that are oriented in different directions. The imagers 302 and 304 are oriented orthogonally. User selectable display modes display views captured by one or both of these imagers 302 and 304.

The imager head 300 has head movement position sensors. Flow of the imager head 300 is sensed by optical mouse chip flow sensors 306 combined with lasers 308 emitting laser beams. A 3 axis gyroscope chip 312 and a 3 axis accelerometer chip 314 are also disposed in head 300. It is envisioned that alternative or additional sensors disposed in head 300 include sonar technology with triangulation, differential GPS, gimbal, and/or eyeball ballast.

Returning to FIG. 2C, the cable reel 208 also has a sensor that tracks feeding and/or retracting of the cable reel. In addition to captured images, sensed imager movement is communicated to reel 208 by cable 206. Captured images are then wirelessly communicated by the reel 208 to handheld display 202, together with sensor information provided by the sensors in the imager head and the sensor in the reel 208.

Handheld display 202 employs the sensed imager movements to track the imager head movement over time by using the sensed imager movements to recursively determine the head position. Handheld display 202 records this tracked imager head movement in a computer readable medium as a sequence of imager head positions. Handheld display 202 concurrently tracks imager head movement over time by extracting motion vectors from the captured images and using the motion vectors to recursively determine the head position. Handheld display 202 records this tracked imager head movement in a computer readable medium as a sequence of these imager head positions. Next, handheld display 202 determines the imager head position by comparing the two records of tracked imager head movement. Comparing the two records achieves improved accuracy in determining the imager head position.

Turning now to FIG. 5, a device discovery process executed by the transmitter/display housing 500 involves interrogating a device in communication with a microprocessor 504 of the transmitter/display housing 500. For example, the microprocessor 504 employs SDATA and SCLK signals to interrogate the device by I2C communication lines. An example device is a tool head having an imager integrated circuit.

Referring particularly to FIG. 5A, the tool head is a standard tool head 502A that is sold with the remote inspection device in combination with the transmitter/display housing 500. Default software for operating the standard tool head 502A is stored in a memory of the microprocessor 504 prior to sale of the remote inspection device. When the transmitter/display housing 500 is first turned on, a boot loader stored in the memory of the microprocessor 504 interrogates the standard imager head by sending an inquiry to the imager head 502A in accordance with a default interrogation protocol. The imager integrated circuit 506A of the standard tool head 506 is preprogrammed to reply to the inquiry message and thus confirm to the microprocessor 504 that it is the standard tool head 502A. In particular, the imager integrated circuit 506A supplies its manufacturer number to the microprocessor 504. In response to this reply, the microprocessor 504 loads the default software for operating the standard tool head 506. Subsequently, the microprocessor 504 employs the default software to boot the remote inspection device and operate the remote inspection device by employing the standard tool head 502A and exploiting its capabilities. In addition, the microprocessor supports use of alternative accessories in the event an accessory, such as a non-standard tool head, is connected to the transmitter/display housing 500 in place of the standard tool head 502A. In this case, the microprocessor responds to failure to receive a reply from the device by employing another communication protocol to interrogate the device.

Referring now particularly to FIG. 5B, the boot loader of the microprocessor 504, if no reply is received from the standard tool head 502A, employs a non-default interrogation protocol to interrogate a non-standard tool head 502B. In this case, the non-standard tool head 502B has a microprocessor 508 interposed between the I2C lines and an imager integrated circuit 506B of the non-standard tool head 502B. The microprocessor 508 responds to the interrogation by providing a manufacturer's number pre-programmed into a memory of the microprocessor 508. The microprocessor 504 recognizes the manufacturer's number received from the non-standard tool head 502B and employs it to access, load, and boot software for operating the non-standard tool head 502B. It should be readily understood that the microprocessor 508 sequentially employs the default and non-default communication protocols to interrogate various types of devices in communication with the microprocessor 504, and that the communication can occur by any of the aforementioned wired or wireless communication protocols.

Turning now to FIG. 6, various types of accessory devices are provided in the form of upgrade kits 600A-600E. These kits 600A-600E include software 602 stored on computer readable media. Different ones of the accessory kits 600A-600E have different software 602A-602E for upgrading the transmitter/display housing 500 with new software for operating accessory devices 604 with which the software 602 is bundled for sale. These kits 600A-600C also include accessory devices 604. Example accessory devices include imager heads 604A and 604B having capabilities that are different from those of a standard imager head. Other examples of accessory devices 604 are a head mounted display 604C, and an audio device 604D. Still more examples of accessory devices are expansion cards 604E-604H that extend capabilities of other accessory devices 604 and/or standard equipment. Such accessory devices 604 are supported by loading the software 602 onto a memory of the transmitter/display housing 500 by using a computer processor 606.

Turning now to FIG. 7, a memory 700 of a microprocessor of the transmitter/display housing has a plurality of sectors. One or more of the sectors stores a boot loader 702 that is second stage loader. This boot loader interrogates devices in communication with the transmitter/display housing to determine what kind of hardware devices are present. Then, for each detected hardware device (e.g., manufacturer's number), the boot loader 702 references a database 704 stored in the memory 700 to determine which boot bay of the memory 700 contains the software for booting the hardware device. The 704 database stores a table 706 relating hardware profiles, such as manufacturer's numbers, to boot bays. The boot loader 702 thus loads code, such as default code 708, from the indicated boot bay for operating the device and attempts to run the code. If unsuccessful, the boot loader 702 determines that there is a need for a software upgrade.

Turning now to FIG. 8, a method of operation for a boot loader of a remote inspection device detects presence of devices at step 800, such as an imager head, an audio device, and an expansion card. The boot loader next interrogates each device at step 802 according to standard communication protocols specific to the device types. For example, a standard imager head has a standard interrogation protocol (e.g., I2C), a standard audio device has another standard interrogation protocol (e.g., wireless protocol), and a standard expansion card has its own standard communication protocol (e.g., proprietary).

Replies received from the devices indicate the category of each device (e.g., standard or non-standard). A reply received from the imager head indicates at decision step 804 that it is the standard imager head, which has a manufacturer's number. Non-receipt at decision step 804 of replies from the audio device and the expansion card causes second inquiry messages to be sent to these non-standard devices at step 806 according to second message protocols.

Like inquiry messages sent to devices according to standard message protocols, subsequent inquiry messages sent to non-standard devices by non-standard message protocols vary by device type (e.g., wired or wireless). If a reply is not received in response to a subsequent inquiry, that device is determined at decision step 808 to be a device that is not supported. Accordingly, a message is displayed at step 810 that indicates that the device is unknown.

If replies are received from all of the devices, then a profile of the manufacturers' numbers for the combination of connected devices is looked up in a database of device profiles at step 812. If a corresponding profile is not found at decision step 814, then a message is displayed at step 816 that indicates a hardware mismatch. An example of a hardware mismatch is a case in which a head mounted display is employed, but an expansion card for an audio device is inserted instead of an expansion card for the head mounted display. Absence of this profile in the database therefore identifies a hardware mismatch.

If a matching profile is found at step 814 for the combination of connected hardware, then an attempt is made to load the code for each device in the profile at step 818. If the attempt fails at decision step 820, then it is assumed that the software for operating one or more of the devices is not stored in the indicated boot bay(s). Therefore, a message is displayed at step 822 that an upgrade is needed. Similarly, if all of the code is successfully loaded at step 820, but an attempt to run the code at step 824 fails at step 826, then it can be assumed that software installed in one or more of the indicated boot bays is not the correct software. For example, presume that a new version of a peripheral device might be acquired by a user and connected to the remote inspection device. If the user does not upgrade the software for operating that newer version of the peripheral device, then the attempt to boot with the older version of the software is unsuccessful, and an upgrade of the software is needed. But if the attempt to run the loaded software at step 824 is successful at decision step 826, then the remote inspection device is operated while successfully exploiting the capabilities of all of the connected peripheral devices.

The preceding description is merely exemplary in nature and is not intended to limit the present disclosure, application, or uses.

What is claimed is:

1. A remote inspection apparatus, comprising:
a display housing coupled to a proximate end of a cable and configured to be grasped by a user, wherein the cable encapsulates at least two wires that form a serial data bus;
an imager housing that detachably couples to a distal end of a cable and houses an imaging device therein, the imaging device being operable to capture an image proximate to the distal end of the cable, convert the image into a video signal and transmit the video signal over the serial data bus;
an inspection accessory device that detachably couples to the distal end of the cable in lieu of the imager housing and houses a sensor therein, the sensor being operable to capture data proximate to the distal end of the cable and transmit the data over the serial data bus;
wherein the display housing includes a display adapted to receive the video signal and graphically render the image, a computer memory that stores one or more instances of software for operating the inspection apparatus, and a computer processor in data communication with the computer memory to operate a boot loader program that: (a) sends a first inquiry over the serial data bus in accordance with a default interrogation protocol; (b) loads a default instance of software from the computer memory upon receiving a reply to the first inquiry; (c) sends a second inquiry over the serial data bus in accordance with a non-default interrogation protocol upon failing to receive a reply to the first inquiry; (d) loads another instance of software from the computer memory upon receiving a reply to the second inquiry, where the another instance of software operates the inspection apparatus such that the inspection apparatus is compatible with the inspection accessory device.

2. The remote inspection apparatus of claim 1, further includes an audio device in wireless communication with the computer processor in the display housing.

3. The remote inspection apparatus of claim 1, further includes a head mounted display in wireless communication with the computer processor in the display housing.

4. The remote inspection apparatus of claim 3, wherein the display housing includes an expansion card configured to enhance capabilities of the head mounted display.

5. The remote inspection apparatus of claim 1, wherein the boot loader program reports that a device is unknown if neither the first reply nor the second reply is received.

6. The remote inspection apparatus of claim 1, wherein said computer memory records a plurality of device profiles, and the boot loader program reports a hardware mismatch if no profile exists that accommodates all of the replies.

7. The remote inspection apparatus of claim 1, wherein the boot loader program reports need for a software upgrade if an attempt to retrieve the software fails.

8. The remote inspection apparatus of claim 1, wherein the boot loader program reports need for a software upgrade if an attempt to run the software fails.

9. The remote inspection apparatus of claim 1, wherein said computer processor is adapted to communicate with a source of new software and download the new software to the computer memory.

10. The remote inspection apparatus of claim 9, wherein the source of the new software is an expansion card inserted into said display housing.

11. The remote inspection apparatus of claim 9, wherein the source of the new software is a computer readable medium running on an external computer processor in communication with said computer processor.

12. The remote inspection apparatus of claim 1, wherein said serial data bus operates in accordance with I2C.

13. The remote inspection apparatus of claim 1, wherein serial data bus operates in accordance with USB.

14. The remote inspection apparatus of claim 1, wherein the imaging device having an imager integrated circuit that responds to the first inquiry with a first reply.

15. The remote inspection apparatus of claim 1, wherein the inspection accessory device having an imager integrated circuit in communication with an imager head microprocessor, and the imager head microprocessor responds to the second inquiry with a second reply.

16. The remote inspection apparatus of claim 15, wherein the imager head microprocessor replies with an identifier for the inspection accessory device.

\* \* \* \* \*